UNITED STATES PATENT OFFICE.

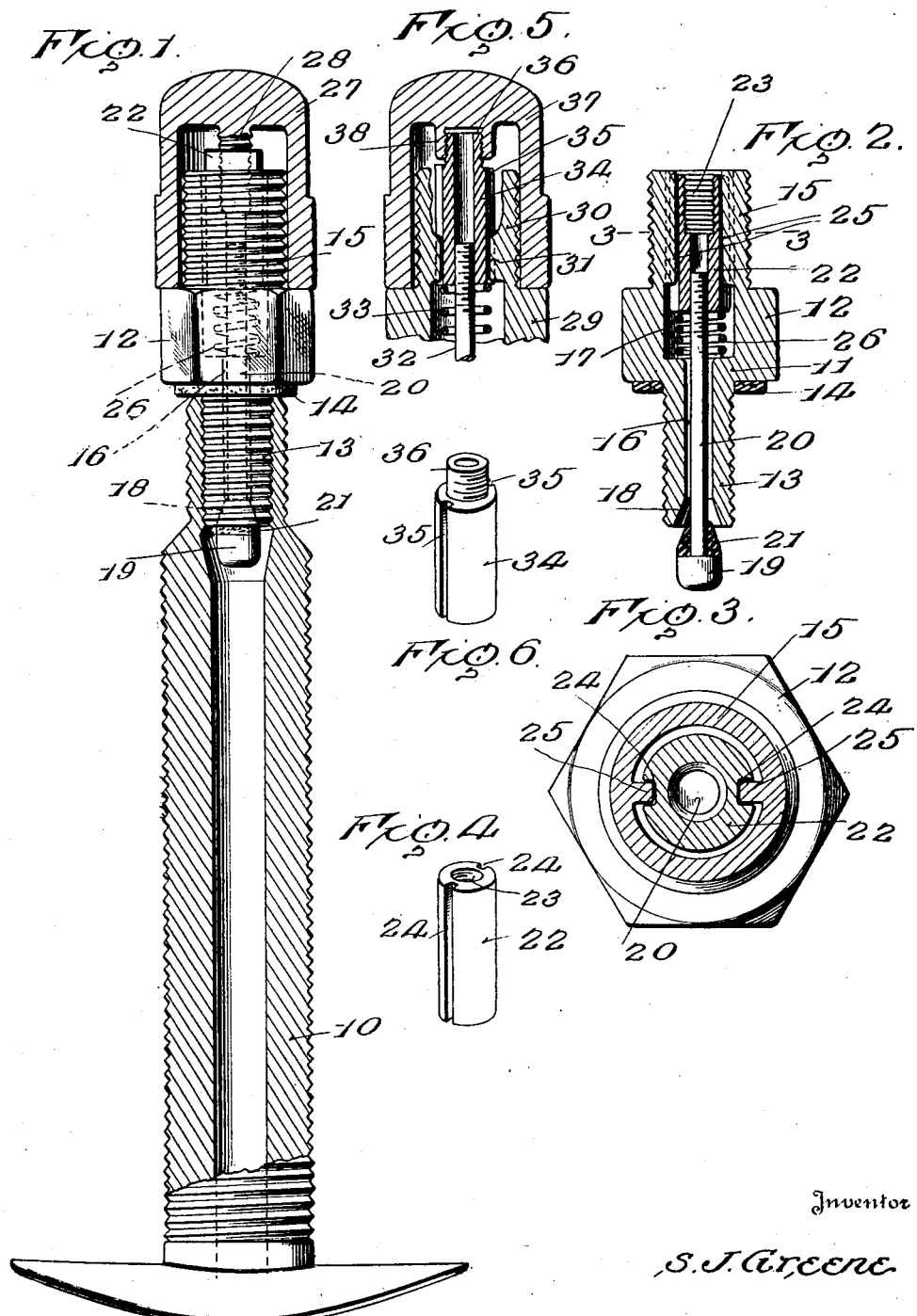

SAMUEL J. GREENE, OF ROANOKE, VIRGINIA, ASSIGNOR, BY MESNE ASSIGNMENTS, TO THE PAYNE VALVE CORPORATION, OF ROANOKE, VIRGINIA.

TIRE-VALVE.

1,334,996.  Specification of Letters Patent.  Patented Mar. 30, 1920.

Application filed February 14, 1918. Serial No. 217,104.

*To all whom it may concern:*

Be it known that I, SAMUEL J. GREENE, a citizen of the United States, residing at Roanoke, in the county of Roanoke and State of Virginia, have invented certain new and useful Improvements in Tire-Valves, of which the following is a specification.

This invention relates to an improved valve for pneumatic tires and has as its primary object to provide a device of this character which may be engaged in the outer end of a valve casing to supplant the usual valve of the casing and which may be employed in connection with the valve casing of substantially any conventional type of tire for retaining the air within the tire.

The invention has as a further object to provide a tire valve so constructed that the valve may be positively moved and held in binding engagement with its seat so that jolting of the tire cannot act to displace the valve and permit a consequent escapement of air from the tire.

The invention has as a still further object to provide a valve employing a valve body and a cap for the body, and wherein upon application of the cap to the body direct connection will be established between the cap and the valve so that the cap, when turned to close the valve body, will coact with the said body to bind and rigidly hold the valve in engagement with its seat.

And a still further object of the invention is to provide a valve of the above described character so formed that a tire pump or hose from an air tank may be connected directly with the outer end of the valve body so that no leakage of air can occur in the operation of inflating the tire, due to any peculiar construction of the valve.

Other and incidental objects will appear as the description proceeds, and in the drawings wherein I have illustrated the preferred embodiment of the invention, and wherein similar reference characters designate corresponding parts throughout the several views.

Figure 1 is a vertical sectional view showing on an enlarged scale my improved valve in connection with the valve casing of a conventional type of tire or inner tube, Fig. 2 is a vertical sectional view showing the body of the valve detached and particularly illustrating the mounting of the valve within the body, Fig. 3 is a transverse sectional view taken on the line 3—3 of Fig. 2, and particularly illustrating the manner in which the coupling sleeve of the valve is held against rotation upon the valve body.

Fig. 4 is a detail perspective view showing the coupling sleeve of the valve detached, Fig. 5 is a fragmentary sectional view illustrating a slightly modified form of the invention, and Fig. 6 is a detail perspective view showing the coupling sleeve of the modified construction detached.

In order that the construction, mounting and operation of my improved device may be accurately understood, I have, in the drawings, shown said device in connection with a valve casing 10 of a conventional type of tire inner tube. In carrying out the invention I employ a cylindrical valve body 11 provided intermediate its ends with an enlarged wrench receiving portion or shoulder 12. The lower extremity of the valve body is somewhat reduced to provide a shank 13 which is screw threaded to engage within the upper extremity of the valve casing 10, as shown in Fig. 1, and if desired a suitable gasket 14 may be interposed between the upper end of the casing and the wrench receiving portion 12 of the valve body. At its upper extremity the valve body provides a nipple 15 upstanding from the wrench receiving portion 12 and screw threaded to receive the hose connection of a tire pump or supply tank. Formed through the valve body is an axial bore 16 which is somewhat reduced within the shank 13 and, at the wrench receiving portion 12 is intersected by an annular recess 17. At its lower end the bore 16 is enlarged to provide a conical valve seat 18 at the adjacent terminal of the shank 13.

Mounted upon the valve body is a valve 19 provided with a stem 20 extending loosely through the bore 16 of the said valve body and terminating therein slightly above the recess 17. Surrounding the valve stem to seat against the valve is a frusto-conical gasket 21 adapted to snugly fit within the seat 18. Screw threaded upon the extremity of the valve stem is a nut or sleeve 22 shown in detail in Fig. 4 of the drawings. This sleeve, at its upper end, is provided with an axial screw threaded socket 23, the purpose of which will presently appear, and formed in opposite sides of the said sleeve are longitudinally extending grooves 24. These grooves open at opposite ends of the sleeve and, as particularly shown in Fig. 3, slidably receive suitable locking ribs or splines 25 projecting into the bore 16 of the valve body from opposite sides of the nipple 15. Thus, the sleeve 22, while being slidable within the valve body, will, nevertheless, be held against rotation to release the valve stem 20. Bearing between the inner end of the said sleeve and the bottom wall of the recess 17 is a helical spring 26 surrounding the valve stem and acting to normally maintain the valve 19 closed. It will accordingly be seen that my improved valve will, when connected to a valve casing, as shown in Fig. 1, automatically act to retain the air within the tire carrying the casing and consequently the usual valve mechanism located in the casing is eliminated.

Loosely fitted upon the nipple 15 of the valve body is a closure cap 27 therefor. This closure cap is smooth upon its inner side and, at its inner end, is provided with an axial screw threaded stud 28 adapted to engage within the socket 23 of the sleeve 22, when the cap is applied. The purpose of this socket therefore now becomes apparent and since the sleeve is, as previously explained, held against rotation, the said sleeve will when the cap has been rotated to engage at its inner end with the wrench receiving portion or shoulder 12 of the valve body, be drawn up upon the said stud to shift the valve 19 against its seat and tightly clamp the valve in engagement with the said seat. The stud 28, therefore, provides a direct connection between the cap and the valve for positively shifting the valve to closed position and tightly binding and rigidly holding the said valve against its seat. It will thus be clear that, in the practical use of the valve, jolting of the tire cannot serve to unseat the valve to permit escapement of air through the valve stem and a consequent ultimate deflation of the tire. At the same time, the stud 28 also provides a connection between the closure cap and the valve body, holding the cap against displacement.

Attention is now directed to the fact that the cap 27 may be removed in order that a valve gage may be applied in the usual manner at the outer end of the valve body for depressing the valve 19 and consequently obtaining a reading of the air pressure within the tire. When the said valve is so depressed it will be noted that nothing in the peculiar construction of the valve will make it possible for any air to escape other than at the outer end of the valve body. Furthermore, it is also to be observed that when it is desired to inflate the tire, the hose connection of a tire pump or hose connection of a supply tank may be screwed upon the nipple 15 and thus connected directly to the valve body so that no leakage of air from the valve body can occur, due to any peculiar construction of the valve.

It will, therefore, be seen that I provide a very simple and efficient construction for the purpose set forth and a valve which may be employed in connection with the valve stem of substantially any conventional type of pneumatic tire.

In Figs. 5 and 6 of the drawings I have illustrated a slight modification of the invention which relates more particularly to the construction of the coupling sleeve of the valve and the cap for the valve body. In these figures the valve body is indicated at 29, the nipple at the upper end thereof at 30, the oppositely disposed ribs within the said nipple at 31, the valve stem at 32, and the spring normally holding the valve closed at 33. All of these parts are identical with the corresponding parts of the preferred construction and serve a similar function. Screw threaded upon the upper end of the valve stem is a coupling sleeve 34, shown in detail in Fig. 6. This sleeve is provided in opposite sides thereof with longitudinally extending slots 35 slidably receiving the ribs 31 for holding the sleeve against rotation within the nipple 30. Formed on the upper end of the said sleeve is a reduced upstanding nipple or extension 36. Removably connected with the valve body and loosely fitted upon the nipple 30 is a closure cap 37 provided at its inner end with an axial socket or flange 38 internally threaded to engage the nipple 36 of the sleeve 34. Consequently, when the cap is rotated upon the nipple 30 of the valve body, engagement between the nipple 36 and socket 38 will act to draw the sleeve 34 upwardly for closing the valve and rigidly holding the said valve in binding engagement with its seat.

Having thus described the invention, what is claimed as new is:

1. A device of the character described including a valve body having a valve seat, a valve mounted upon the body to coöperate with said seat and provided with a valve stem, a coupling member engaged with the stem and free for movement axially of the valve body, the stem being adjustable upon the member for varying the effective length of the stem a cap for the valve body adapted to have adjustable engagement with said member to be coupled thereby with the valve whereby the cap may be rotated against the valve body for shifting the valve to closed position in engagement with said seat, and means locking the coupling member against rotation whereby said coupling member will interrupt communication of rotary movement of the cap to the valve.

2. A device of the character described including a valve body having a valve seat, a valve mounted upon the valve body to coöperate with said seat and provided with a stem, a coupling member carried by the stem, the stem being adjustable upon the member for varying the effective length of the stem, and a cap for the valve body adapted to have adjustable engagement with said member to be coupled thereby with the valve whereby the cap may coact with the valve body for shifting the valve to closed position in engagement with said seat.

3. A device of the character described including a valve body having a valve seat, a valve mounted upon the valve body to coöperate with said seat and provided with a stem, a coupling member carried by the stem, yieldable means bearing between the valve body and said coupling member and normally holding the valve closed in engagement with said seat, and a cap for the valve body adapted to have adjustable engagement with said member to be coupled thereby with the valve whereby the cap may coact with the valve body for binding the valve against the seat, the valve stem being adjustable upon the coupling member for positioning the outer end of said member with respect to the outer end of the valve body whereby to vary the adjustment of the cap upon the member before coming into coacting relation with the valve body.

In testimony whereof I affix my signature.

SAMUEL J. GREENE. [L. S.]